(12) United States Patent
Ichikawa et al.

(10) Patent No.: US 6,746,140 B2
(45) Date of Patent: Jun. 8, 2004

(54) REAR-VIEW MIRROR AND INTERIOR LIGHTING SYSTEM

(75) Inventors: Takashi Ichikawa, Aichi-ken (JP); Masakazu Aoki, Aichi-ken (JP); Tadashi Ejiri, Aichi-ken (JP); Masami Hosono, Aichi-ken (JP); Hiroyuki Kato, Aichi-ken (JP); Kenichi Jinushi, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/968,631

(22) Filed: Oct. 2, 2001

(65) Prior Publication Data

US 2002/0041497 A1 Apr. 11, 2002

(30) Foreign Application Priority Data

Oct. 5, 2000 (JP) .......................... 2000-306567

(51) Int. Cl.[7] .............................. B60Q 3/02; B60R 1/12; F21V 21/30; F21V 21/32
(52) U.S. Cl. ...................... 362/494; 362/142; 362/183; 362/396; 362/419; 362/486; 362/528
(58) Field of Search .................. 362/135, 140–144, 362/183, 396, 418–421, 486, 494, 515, 528, 492

(56) References Cited

U.S. PATENT DOCUMENTS

| | | | | |
|---|---|---|---|---|
| 4,443,831 A | * | 4/1984 | Godfrey et al. | 362/494 |
| 4,511,954 A | * | 4/1985 | Marcus et al. | 362/492 |
| 4,733,336 A | * | 3/1988 | Skogler et al. | 362/142 |
| 4,734,831 A | * | 3/1988 | Keyser et al. | 362/492 |
| 4,974,129 A | * | 11/1990 | Grieb et al. | 362/183 |
| 5,070,434 A | * | 12/1991 | Suman et al. | 362/528 |
| 5,077,643 A | * | 12/1991 | Leach | 362/183 |
| 5,124,845 A | * | 6/1992 | Shimojo | 362/135 |
| 5,208,618 A | * | 5/1993 | Brunette | 362/492 |
| 5,651,605 A | * | 7/1997 | Corn | 362/492 |
| 6,079,858 A | * | 6/2000 | Hicks | 362/486 |
| 6,428,172 B1 | * | 8/2002 | Hutzel et al. | 362/494 |

FOREIGN PATENT DOCUMENTS

| | | | |
|---|---|---|---|
| DE | 2911707 A | 10/1980 | |
| DE | 3333048 A * | 3/1985 | ............... 362/492 |
| EP | 1103420 A2 | 5/2001 | |
| GB | 2332185 A | 6/1999 | |
| JP | 59-27947 | 2/1984 | |

OTHER PUBLICATIONS

European Search Report, Feb. 21, 2002.

* cited by examiner

Primary Examiner—Alan Cariaso
(74) Attorney, Agent, or Firm—Nixon Peabody, LLP

(57) ABSTRACT

A rear-view mirror for a vehicle. The rear-view mirror has a mirrow body at which is formed an accommodating member. A lamp house containing a lamp bulb and a secondary battery is accommodated in the accommodating member by holders for holding the lamp house from below. The lamp house is pulled out from the accommodating member to illuminate a desired position.

16 Claims, 11 Drawing Sheets

REAR-VIEW MIRROR AND INTERIOR LIGHTING SYSTEM

BACKGROUND OF THE INVENTION

1. Field of the Invention

The present invention relates to a rear-view mirror mounted in the cabin of a vehicle and to an interior lighting system for a vehicle including a room lamp and a map lamp.

2. Description of the Related Art

Ordinarily, a lighting device known as a map lamp is mounted above an area between a driver's seat and a passenger seat in the cabin of a vehicle. The map lamp can be used, for example, as a light in order to view a map inside the vehicle at night.

The map lamp is often mounted at a roof panel of the vehicle. However, in a convertible whose roof is sometimes removed, there is no roof panel for mounting the map lamp, and thus, the map lamp is often mounted near an upper edge of a windshield glass (a front glass). In particular, the map lamp is often integrated with a rear-view mirror.

The conventional map lamp is fixed to the roof panel or the edge of the windshield glass of the vehicle, and whereby the map lamp can only illuminate a direction that is fixed (e.g., a lower direction with respect to the vehicle). For this reason, when the map lamp is used to view a map inside the vehicle, the map needs to be moved under the map lamp. Similarly, when the map lamp is used to illuminate things other than a map or the user (passenger) himself/herself, the object to be illuminated needs to be moved to the position illuminated by the light, i.e., a position under the map lamp.

As the riding environment of cabins has improved, there has been an increasing demand for further improvements in the facility of the cabins. In short, there has been a demand for a map lamp that can be used to illuminate not only a position in the lower direction of the vehicle, but many directions as well.

SUMMARY OF THE INVENTION

In view of the above facts, an object of the present invention is to obtain an interior lighting system, which can illuminate not only a fixed position but many positions in accordance with the position desired to be illuminated, and a rear-view mirror for a vehicle that includes the interior lighting system.

In accordance with a first aspect of the present invention, a rear-view mirror for a vehicle comprises a mirror body, mounted at a suitable position inside the vehicle, for holding a mirror having a reflecting surface oriented toward a predetermined direction; and lighting devices, detachably disposed at the mirror body, for illuminating, with the lighting devices illuminating a first illumination direction when the lighting devices are mounted to the mirror body.

According to the rear-view mirror having the above-described structure, the mirror body to which the mirror is fixed is mounted at a suitable position inside the vehicle. By viewing the mirror fixed to the mirror body, the direction toward which the mirror is oriented can be viewed. For example, when the reflecting surface of the mirror is oriented toward a substantially rear direction of the vehicle, the substantially rear direction of the vehicle can be viewed in the mirror.

The lighting devices are provided at the mirror body. When the lighting device emits light, the first illumination direction is illuminated.

Further, the lighting device can be mounted to and detached from the mirror body. When the lighting device is detached from the mirror body and oriented in a desired direction toward a desired position, the desired position can be illuminated by the lighting device.

In this manner, when the lighting device is detached from the mirror body, not only the initial (first) illumination direction but other directions as well can be illuminated. As a result, facility of the lighting device, i.e., facility of the rear-view mirror, is improved.

In the rear-view mirror of the present invention, preferably, the lighting device includes a lamp house containing a light source, with an opening being formed at the lamp house to enable light inside the lamp house to be transmitted in a predetermined direction, and a holding member for holding the lamp house at a predetermined position in the mirror body.

According to the rear-view mirror having the above-described structure, the light source is contained inside the lamp house which can be mounted to and detached from the mirror body. When the lamp house is mounted to the mirror body and the light source emits light, the light is transmitted through the opening of the lamp house in the first illumination direction, whereby the first illumination direction is illuminated.

Further, when the lamp house is detached from the mirror body and the opening is oriented in a desired direction toward a desired position, the desired position can be illuminated by the lighting device.

More preferably, the rear-view mirror of the present invention further comprises an electrical feeder for supplying electricity from an electric source to the light source, the electrical feeder having one end and the other end, with the one end being directly or indirectly connected to the electric source through the inside of the mirror body and the other end being connected to the light source through the inside of the lamp house, wherein the electrical feeder is accommodated at at least one of the mirror body and the lamp house when the lamp house is mounted to the mirror body.

According to the rear-view mirror having the above-described structure, the electrical feeder connected to the light source is connected to the electric source outside the mirror body through the inside of the lamp house and the inside of the mirror body. Mirror bodies and lamp houses are of necessity relatively compact due to the position at which they are disposed within the cabin. For this reason, when an electric source is accommodated in such a mirror body and lamp house interior, necessity dictates that only an electrical source having a small capacity can be accommodated therein. In contrast, the light source in the present invention is connected to the electric source outside the mirror body and the lamp house via the electrical feeder. Thus, an electric source having a relatively large capacity can be accommodated.

Still more preferably, the rear-view mirror of the present invention further comprises a battery for supplying electricity to the light source to enable the light source to emit light, with the battery being contained in the lamp house in a state in which the battery is electrically connected to the light source.

According to the rear-view mirror having the above-described structure, the light source is made to emit light by the battery contained in the lamp house. Therefore, when the lamp house is detached from the mirror body, the lamp house can be freely moved without restriction.

In accordance with a second aspect of the present invention, an interior lighting system for a vehicle comprises a housing mounted at a suitable position inside the vehicle; and lighting devices, detachably disposed at the housing, for illuminating, with the lighting devices illuminating a first illumination direction when the lighting devices are mounted to the housing.

According to the interior lighting system having the above-described structure, the lighting devices are provided at the housing mounted at a suitable position inside the vehicle. When the lighting device emits light, the first illumination direction is illuminated.

Further, the lighting device can be mounted to and detached from the housing. When the lighting device is detached from the housing and oriented in a desired direction toward a desired position, the desired position can be illuminated by the lighting device.

In this manner, when the lighting device is detached from the housing, not only the initial illumination direction but other directions as well can be illuminated. As a result, facility of the interior lighting system is improved.

DESCRIPTION OF THE PREFERRED EMBODIMENTS

First Embodiment

Figure 1:
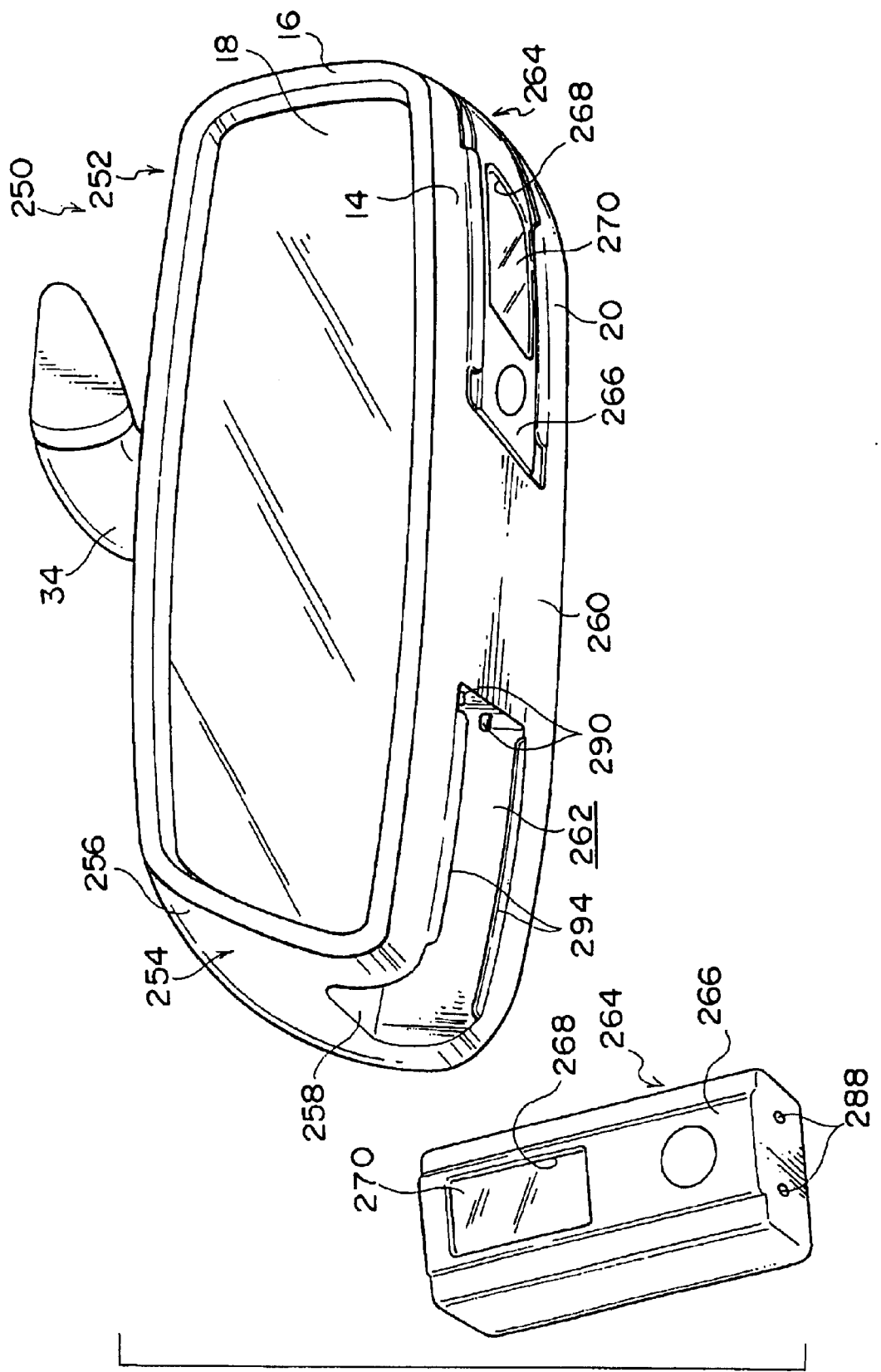
FIG. 1 is a perspective view of an exterior of a rear-view mirror according to a first embodiment of the present invention.

FIG. 1 is a perspective view of an exterior of a rear-view mirror 250 (an interior light) according to a first embodiment of the present invention. As shown in FIG. 1, the rear-view mirror 250 includes a mirror body 252 (a housing).

The mirror body 252 has, for example, a substantially rectangular front wall 14, whose longitudinal direction corresponds to a substantially lateral direction of a vehicle and whose width direction corresponds to a substantially vertical direction of the vehicle. A peripheral wall 16 is formed along an external periphery of the front wall 14, and the front wall 14 and the peripheral wall 16 have an overall shallow box- or dish-shape opening toward a substantially rear direction of the vehicle. Further, the front wall 14 is provided with a mirror 18 that substantially faces the rear side of the vehicle. The mirror 18 is formed in a substantially rectangular shape, and has an external periphery that corresponds to an internal periphery of the peripheral wall 16. The mirror 18 is fitted inside the peripheral wall 16 in a state in which a reflecting surface of the mirror 18 is oriented toward the substantially rear direction of the vehicle. The mirror 18 is fixed to at least one of the front wall 14 and the peripheral wall 16.

Figure 2:
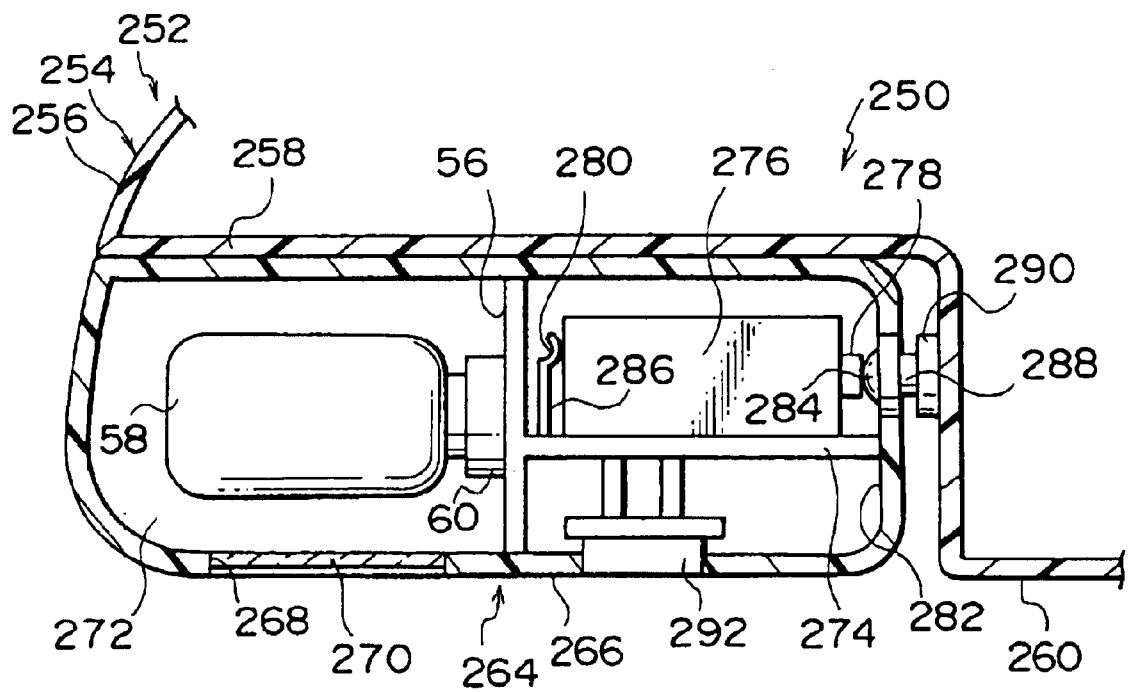
FIG. 2 is a front sectional view of the rear-view mirror according to the first embodiment of the present invention, showing a state in which a lamp house is mounted at a mirror body.

The front wall 14 is provided with a back wall 20 at a substantially front direction of the vehicle, and a peripheral wall 254 is provided between the front wall 14 and the back wall 20 (FIG. 1). The peripheral wall 254 includes an upper wall 256 which curves along upper ends of external peripheries of the front wall 14 and the back wall 20 (FIG. 2). Both longitudinal direction ends of the upper wall 256 are connected to ends of partition walls 258 which form the peripheral wall 254 together with the upper wall 256. The partition wall 258. extends from the portion connected with the upper wall 256 toward central portions of the front wall 14 and the back wall 20 in their longitudinal directions, and a leading end of the partition wall 258 further bends downwardly. The leading end of the partition wall 258 is connected to a lower wall 260 which forms the peripheral wall 254 together with the upper wall 256 and the partition walls 258. The lower wall 260 curves along lower ends of the external peripheries of the front wall 14 and the back wall 20, and both ends of the lower wall 260 are connected to both partition walls 258. As a result, the peripheral wall 254 has an overall tubular shape, and opening ends thereof are closed by the front wall 14 and the back wall 20.

A stay 34 is provided at the upper wall 256. A spherical shaft is formed at one of the stay 34 and the upper wall 256, and a holding portion for rotatably holding the spherical shaft is formed at the other of them. The mirror body 252 and the stay 34 are mechanically connected to each other by the spherical shaft and the holding portion. Further, the stay 34 is integrally fixed to a holding frame at a roof or a front glass (a windshield glass) (not shown) of the vehicle. Since the mirror body 252 and the stay 34 are mechanically connected to each other by the spherical shaft and the holding portion, the mirror body 252 can rotate around the spherical shaft in a predetermined amount with respect to the roof or the front glass of the vehicle, and this rotation enables an orientation of the reflecting surface of the mirror 18 to be changed.

Spaces which exist in lateral directions of the partition walls 258 and between the front wall 14 and the back wall 20 are accommodating members 262, in which lamp houses 264 comprising lighting devices are accommodated. The lamp house 264 is formed in an overall box shape. A substantially rectangular opening 268 is formed at a lower wall 266 of the lamp house 264. When the lamp house 264 is accommodated (i.e., mounted) in the accommodating member 262, the lower wall 266 is oriented in a direction facing the substantially lower direction of the vehicle. Further, a window 270, which is formed in a rectangular shape and comprises a transparent or semitransparent synthetic resin material, is integrally fitted into the opening 268.

A holding wall 56 is uprightly provided inside the lamp house 264, and divides the inside of the lamp house 264 into two spaces in the longitudinal directions of the front wall 14 and the back wall 20 (FIG. 2). A space at one side of the holding wall 56 is a lamp bulb housing 272. A lamp bulb 58 comprising the lighting device is housed inside the lamp bulb housing 272, and the lamp bulb 58 is held by a socket 60 which is integrally provided at the holding wall 56. The lamp bulb housing 272 corresponds to the opening 268 and the window 270. When the lamp bulb 58 emits light, the light from the lamp bulb 58 is transmitted through the window 270 to the outside of the lamp house 264.

A substrate 274 is contained in a space at the side of the holding wall 56 opposite to the lamp bulb housing 272. Further, a secondary battery 276, such as a lead battery or a nickel-cadmium battery, is disposed on the substrate 274. The secondary battery 276 has a pair of terminals 278 and 280. The terminal 278 is connected to a terminal 284 formed at a side wall 282 of the lamp house 264, and the terminal 280 is connected to a terminal 286 provided on the substrate 274. The terminal 286 is connected to a terminal (not shown) formed adjacent to the terminal 284 at the side wall 282 via wiring (not shown) formed on the substrate 274.

A connector 288 is integrally provided outside the side wall 282. The connector 288 is electrically and mechanically connected to both of the terminal 284 and the terminal (not shown) which is provided adjacent to the terminal 284 and connected to the terminal 286. The connector 288 can be electrically and mechanically connected to a connector 290 which is formed at the partition wall 258. The connector 290 is connected to a charging circuit via a lead wire provided inside the mirror body 252, and is further electrically connected to a battery of the vehicle serving as an electric source via another lead wire connected to the charging circuit (components with no reference numerals are not shown), so that the secondary battery 276 can be suitably charged.

Further, a switch 292 is provided at the side of the substrate 274 opposite to the secondary battery 276, and the switch 292 is electrically connected to the secondary battery 276 via the wiring (not shown) formed on the substrate 274. The switch 292 is electrically connected to the lamp bulb 58 via the wiring on the substrate 274 and the socket 60 electrically connected to the wiring. In this manner, the secondary battery 276, the lamp bulb 58 and the switch 292 form an electric circuit. When a button of the switch 292 is pressed toward the inside of the lamp house 264, the electric circuit is made conductive or non-conductive. If the electric circuit is made conductive, electricity can be supplied from the secondary battery 276 to the lamp bulb 58. Since the electric circuit comprising the secondary battery 276, the lamp bulb 58 and the switch 292 is formed independently of (parallel with) the charging circuit and the battery circuit, the secondary battery 276 can be independently charged even when the electric circuit has been made non-conductive by the switch 292.

In accordance with the accommodating member 262, guide rails 294 serving as holders are formed at lower ends of the external peripheries of the front wall 14 and the back wall 20 (FIG. 1). The guide rails 294 extend from both of the front wall 14 and the back wall 20 toward the inside of the accommodating member 262 so as to approach to each other. A distance between the guide rails 294 is smaller than a width of the lamp house 264. In the state in which the lamp house 264 is accommodated in the accommodating member 262, the guide rails 294 support the lamp house 264 from below. If the lamp house 264 is moved with respect to the mirror body 252 while being guided by the guide rails 294, the lamp house 264 can be mounted to and detached from the mirror body 252.

Operation and Effect of First Embodiment

Next, operation and effect of the first embodiment will be described.

The rear-view mirror 250 can be used not only to view the substantially rear direction of the vehicle by the mirror 18, but also as a so-called map lamp when the switch 292 is operated so that electricity is supplied to the lamp bulb 58 to light the lamp bulb 58. Generally, the lamp house 264 is accommodated in the accommodating member 262, and in this state, the opening 268 opens toward a substantially lower direction of the vehicle. Accordingly, when the switch 292 is operated in this state so as to light the lamp bulb 58, the light emitted from the lamp bulb 58 is transmitted through the window 270 of the opening 268, and illuminates a substantially lower direction of the vehicle, which is an initial (first) illumination direction in the first embodiment. In this state, the rear-view mirror 250 can be used in the same manner as the so-called map lamp.

When the lamp house 264 accommodated in the accommodating member 262 is pulled toward the outside of the front wall 14 and the back wall 20 in the longitudinal directions, the connector 288 is disconnected from the connector 290, and the lamp house 264 is guided along the guide rails 294 to move toward the outside of the front wall 14 and the back wall 20 in the longitudinal directions. In this way, the lamp house 264 can be pulled out of the accommodating member 262, i.e., detached from the mirror body 252.

Since the secondary battery 276 is disposed inside the lamp house 264, and electricity is supplied from the secondary battery 276 to the lamp bulb 58 when the electric circuit is made conductive by the switch 292, the lamp bulb 58 can emit light even when the lamp house 264 has been detached. When the lamp house 264 has been pulled out from the mirror body 252, the opening 268 can be oriented in a desired direction to illuminate a desired position. In this manner, the position illuminated by the lamp house 264 is not limited to only the first (initial) illumination direction, but any position may be illuminated in accordance with the position desired to be illuminated.

Second Embodiment

Next, other embodiments of the present invention will be described. In the following embodiments, parts that are essentially the same as those described in the preceding embodiment will be referred to using the same reference numerals, and description thereof will be omitted.

Figure 3:
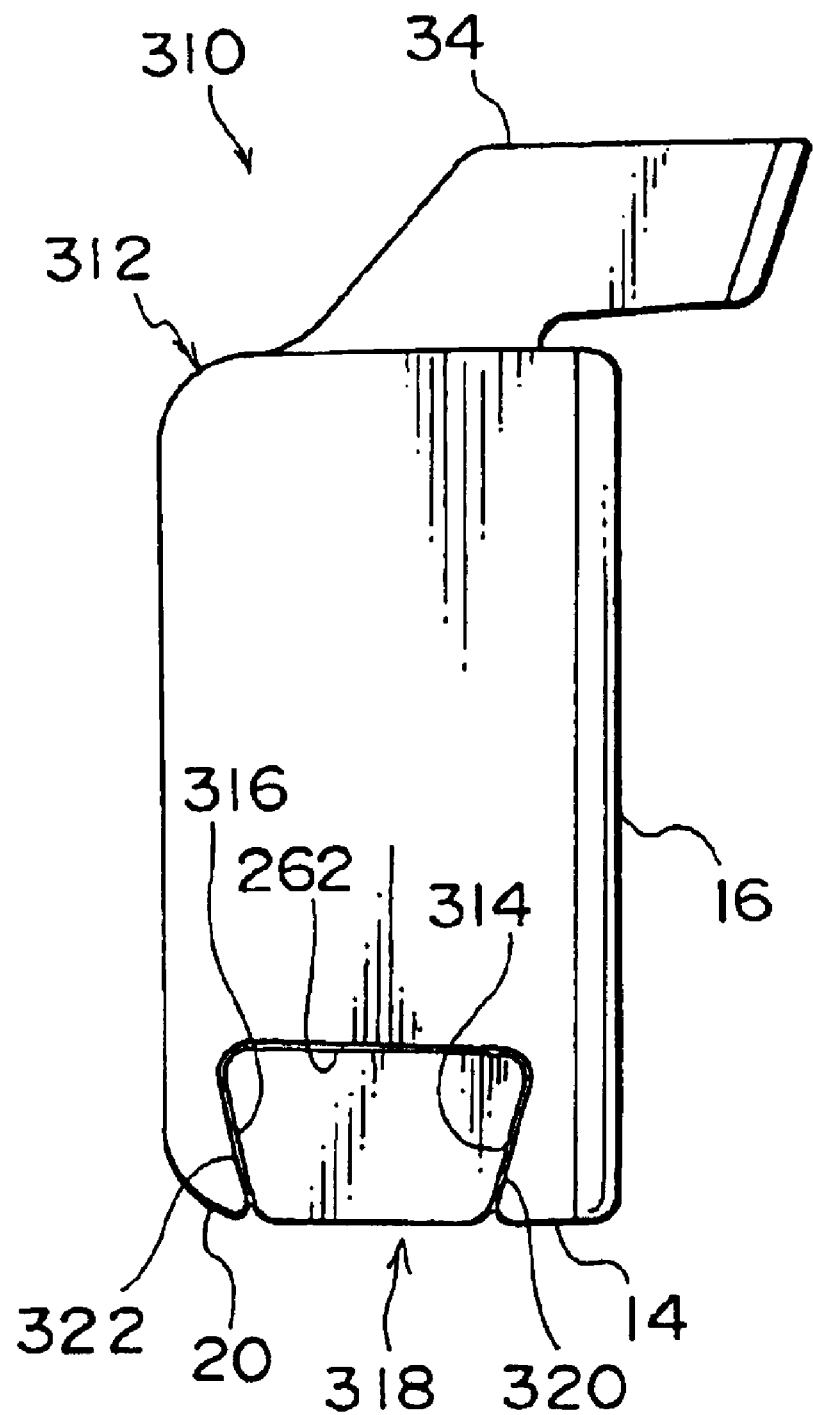
FIG. 3 is a side view of the rear-view mirror according to a second embodiment of the present invention, showing a state in which the lamp house is mounted at the mirror body.

FIG. 3 is a side view of a rear-view mirror 310 (an interior light) according to a second embodiment of the present invention. The rear-view mirror 310 has essentially the same structure as the rear-view mirror 250 according to the first embodiment. However, the guide rails 294 are not formed at the front wall 14 and the back wall 20 of a mirror body 312 of the rear-view mirror 310. Rather, a surface at the back wall 20 side of the front wall 14, which surface corresponds to the accommodating member 262, is formed as an inclined surface 314 inclining away from the front wall 14 and expanding in the lower direction, and a surface at the front wall 14 side of the back wall 20, which surface corresponds to the accommodating member 262, is formed as an inclined surface 316 inclining away from the back wall 20 and expanding in the lower direction, with the inclined surfaces 314 and 316 serving as holders (FIG. 3).

In other words, in the second embodiment, the accommodating member 262 has a trapezoidal shape in side view which gradually tapers toward the lower direction. In correspondence with this shape of the accommodating member 262, a lamp house 318 comprising the lighting device also has a trapezoidal shape. When the lamp house 318 is accommodated in the accommodating member 262, a front wall 320 and a back wall 322 of the lamp house 318 are supported by the inclined surfaces 314 and 316, respectively. The operation and effect of the second embodiment are also essentially the same as those of the first embodiment.

Third Embodiment

Next, a third embodiment of the present invention will be described.

Figure 4:
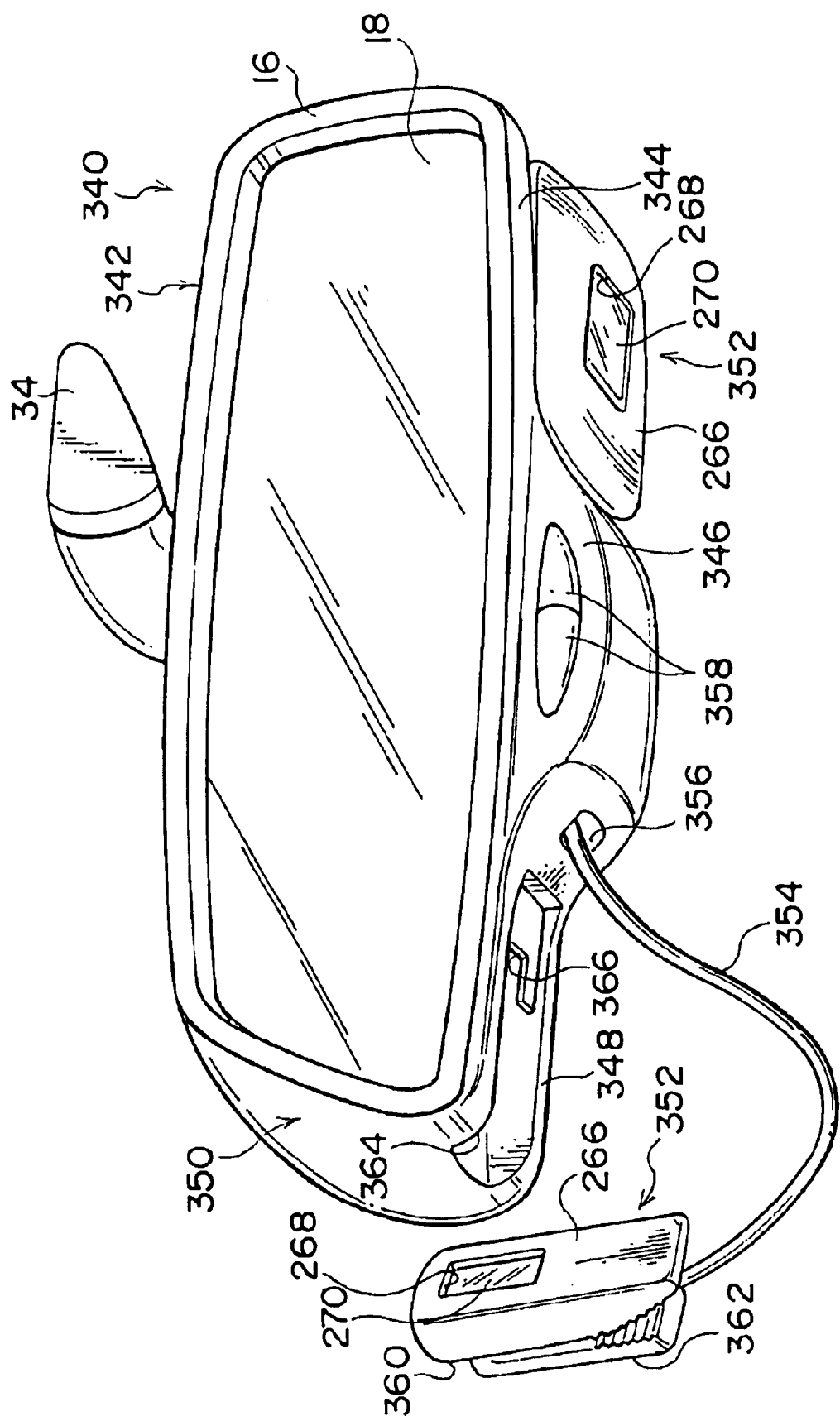
FIG. 4 is a perspective view of an exterior of the rear-view mirror according to a third embodiment of the present invention.

FIG. 4 is a perspective view of an exterior of a rear-view mirror 340 (an interior light) according to the third embodiment. As shown in FIG. 4, the rear-view mirror 340 includes a mirror body 342 (a housing) which corresponds to the mirror bodies 252 and 312 in the first and second embodiments. The mirror body 342 has a front wall 344. The front wall 344 is essentially the same as the front wall 14 of the mirror body 252 in that it has a substantially rectangular shape, the peripheral wall 16 is formed and the mirror 18 is mounted. However, the front wall 344 is different from the front wall 14 in that a switch support 346 extends from a lower end of an external periphery of the front wall 344 toward a substantially lower direction.

The mirror body 342 also has a back wall 348. The back wall 348 is essentially the same as the back wall 20 in the first and second embodiments. However, an external shape of the back wall 348 corresponds to that of the front wall 344.

Further, the mirror body 342 has a tubular peripheral wall 350. An external peripheral shape of the peripheral wall 350 corresponds to external peripheral shapes of the front wall 344 and the back wall 348, and both opening ends of the peripheral wall 350 are closed by the front wall 344 and the back wall 348.

In the mirror body 342 having the above-described structure, lamp houses 352 that each comprise the lighting device are disposed at both sides of the switch support 346. The lamp house 352 has a substantially box shape and contains the lamp bulb 58 (not shown in FIG. 4) in the essentially same manner as the lamp houses 264 and 318 in the first and second embodiments. However, the lamp house 352 does not contain the secondary battery 276.

The rear-view mirror 340 is provided with cords 354 serving as feeders. The cord 354 is a long member in which a pair of flexible wires are covered with, for example, a synthetic resin material so as to be insulated from each other. One longitudinal direction end of the cord 354 is electrically and mechanically connected to the socket 60 inside the lamp house 352, and is further electrically connected to the lamp bulb 58 via the socket 60.

The other end of the cord 354 leads inside the mirror body 342 through a hole 356 formed at the peripheral wall 350, and the other end thereof is electrically connected to a switch 358 supported by the switch support 346. Further, an urging device such as a spring, which urges the cord 354 to be drawn inside the mirror body 342, is provided inside the mirror body 342. Therefore, the cord 354 can be pulled out of the mirror body 342 by a length in accordance with a desired distance between the lamp house 352 and the mirror body 342.

A clip 362 serving as a holding member is provided at an upper wall 360 opposite the opening 268 of the lamp house 352. The clip 362 is attached to the upper wall 360 so that one longitudinal direction end of the clip 362 can rotate in a width direction with respect to the upper wall 360, and the other longitudinal direction end thereof is urged toward the upper wall 360 by an urging device such as a torsion coil spring.

In correspondence with the clips 362, grooves 364 are formed at the peripheral wall 350. The grooves 364 are formed at the peripheral wall 350, at both sides of the switch support 346. The grooves 364 downwardly open at outer sides of the front wall 344 and the back wall 348 in the longitudinal directions. When the clip 362 is slid into the groove 364, movement of the clip 362 in a width direction of the peripheral wall 350 (opening direction) is limited. Further, an opening 366 into which the other longitudinal direction end of the clip 362 can be slid is formed at the peripheral wall 350. When the lamp house 352 and the clip 362 have been moved to a predetermined mounting position, the other longitudinal direction end of the clip 362 is slid through the opening 366 into the mirror body 342. When the other longitudinal direction end of the clip 362 has been slid into the mirror body 342, the peripheral wall 350 is nipped between the clip 362 and the upper wall 360 of the lamp house 352.

Operation and Effect of Third Embodiment

Next, operation and effect of the third embodiment will be described.

The rear-view mirror 340 can be used not only to view the substantially rear direction of the vehicle by the mirror 18, but also as a so-called map lamp when the switch 358 is operated so that electricity is supplied to the lamp bulb 58 to light the lamp bulb 58. Generally, the clip 362 is slid-through the opening 366 into the mirror body 342, whereby the peripheral wall 350 is nipped between the clip 362 and the upper wall 360, and the lamp house 352 is mounted. In this state, the opening 268 opens toward a substantially lower direction of the vehicle. Accordingly, when the switch 358 is operated in this state so as to light the lamp bulb 58, the light emitted from the lamp bulb 58 is transmitted through the window 270 of the opening 268, and illuminates a substantially lower direction of the vehicle, which is a first illumination direction in the third embodiment. In this state, the rear-view mirror 340 can be used in the same manner as the so-called map lamp.

When the lamp house 352 is pulled out, the clip 362 and the upper wall 360 cease to nip the peripheral wall 350 therebetween, the lamp house 352 including the clip 362 is slid toward the outer sides of the front wall 344 and the back wall 348, mechanical connection between the lamp house 352 and the mirror body 342 is released. Further, in this state, the cord 354 can be pulled out of the mirror body 342 in accordance with a desired distance between the lamp house 352 and the mirror body 342. When the lamp house 352 has been pulled out from the mirror body 342, the opening 268 can be oriented in a desired direction to illuminate a desired position. In this manner, the position illuminated by the lamp house 352 is not limited to only the first (initial) illumination direction, but any position may be illuminated in accordance with the position desired to be illuminated.

In contrast to the rear-view mirrors 250 and 310 of the first and second embodiments, the secondary battery 276 is not used in the rear-view mirror 340 of the third embodiment. In the rear-view mirror 340, electricity is supplied from the battery of the vehicle via the cord 354. However, the battery of the vehicle is much larger than the secondary battery 276 and is thus capable of greater electrical output. Therefore, there are advantages in that the battery of the vehicle does not run down as quickly in comparison to the secondary battery 276, and electricity can be stably supplied to the lamp bulb 58 over a long period of time even while the lamp house 352 is moved in the cabin. Unlike the rear-view mirrors 250 and 310, the lamp house 352 cannot be completely separated from the mirror body 342. Movement of the lamp house 352 is restricted to a circular range whose radius corresponds to the entire length of the cord 354. Because the lamp house 352 cannot be completely separated from the mirror body 342, there is no danger of the lamp house 352 becoming lost.

Fourth Embodiment

Next, a fourth embodiment of the present invention will be described.

Figure 5:
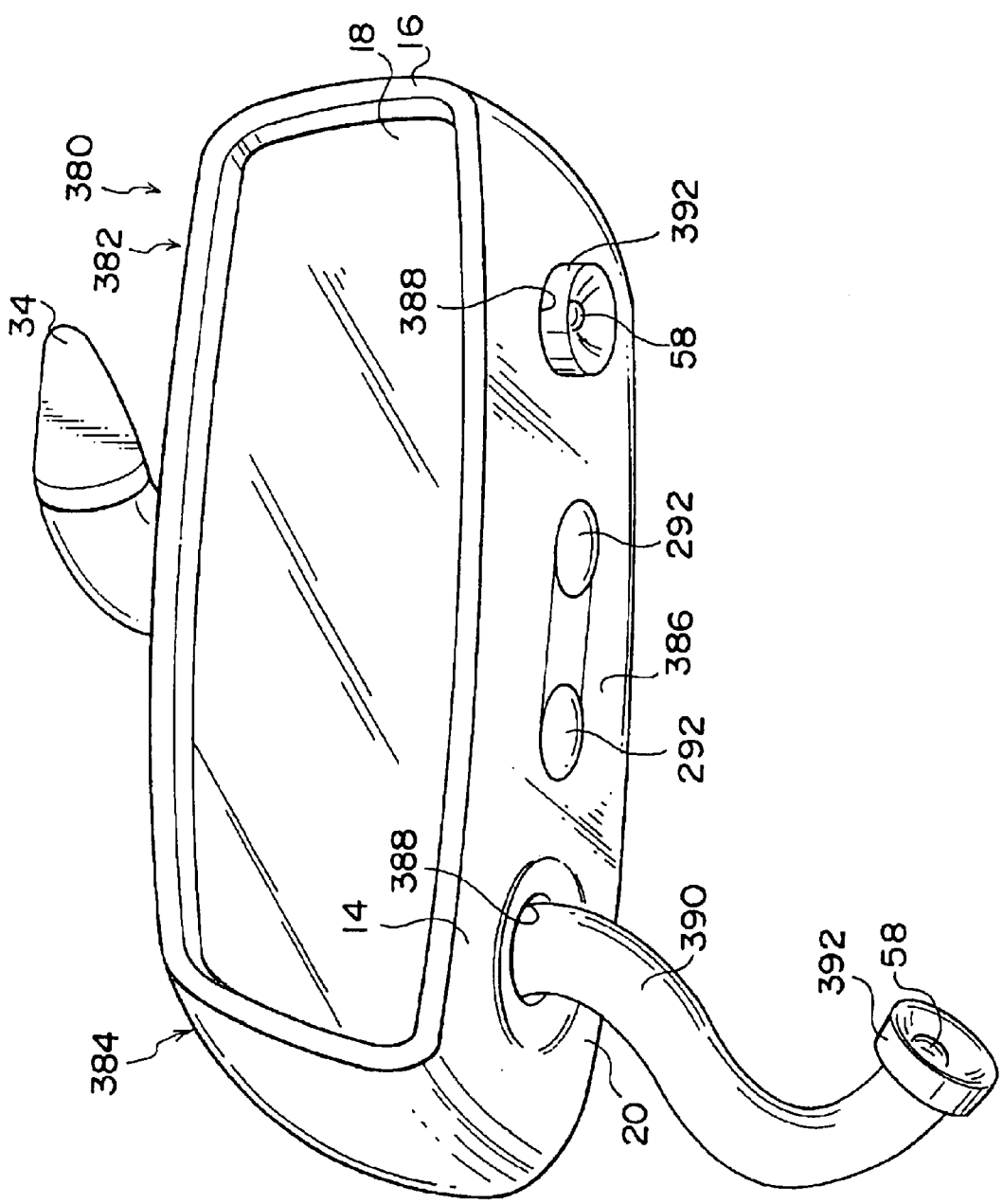
FIG. 5 is a perspective view of an exterior of the rear-view mirror according to a fourth embodiment of the present invention.

FIG. 5 is a perspective view of an exterior of a rear-view mirror 380 (an interior light) according to the fourth embodiment. As shown in FIG. 5, the rear-view mirror 380 includes a mirror body 382. The mirror body 382 has the front wall 14 and the back wall 20. A tubular peripheral wall 384, whose external peripheral shape corresponds to external peripheral shapes of the front wall 14 and the back wall 20, is provided between the front wall 14 and the back wall 20, and both opening ends of the peripheral wall 384 are closed by the front wall 14 and the back wall 20.

A pair of circular holes 388 are formed at a lower wall 386 of the peripheral wall 384, which lower wall 386 corresponds to lower ends of the external peripheries of the front wall 14 and the back wall 20. Each circular hole 388 is formed in the lower wall 386 at a position substantially equidistant from the front wall 14 and the back wall 20 in the longitudinal direction.

The rear-view mirror 380 is provided with cables 390 serving as feeders. The cable 390 is a long member in which a pair of elongated wires are covered with, for example, a synthetic resin material. A socket 392 which serves as a lamp house comprising the lighting device is integrally attached to one longitudinal direction end of the cable 390 in a state in which the socket 392 is electrically connected to the wires. Further, the lamp bulb 58 is attached to the socket 392, and electrically connected to the wires of the cable 390 via the socket 392.

The other longitudinal direction end of the cable 390 leads inside the mirror body 382 through the circular hole 388, and the other end thereof is electrically connected to a switch 292 provided at the peripheral wall 384. Further, an urging device such as a spring, which urges the cable 390 to be drawn inside the mirror body 382, is provided inside the mirror body 382. Therefore, the cable 390 can be pulled out of the mirror body 382 by a length in accordance with a desired distance between the socket 392 and the mirror body 382.

The socket 392 has a cylindrical shape whose external diameter is sufficiently larger than an internal diameter of the circular hole 388. Therefore, although the urging force is applied to the cable 390 to draw the same into the mirror body 382, the cable is prevented from being drawn completely inside the mirror body 382 by the socket 392 abutting against the peripheral wall 384 around the circular hole 388. When the cable 390 is drawn into the mirror body 382 and the socket 392 abuts the peripheral wall 384 around the circular hole 388, the socket 392 is held against the peripheral wall 384 by the urging force.

Operation and Effect of Fourth Embodiment

The rear-view mirror 380 differs from the rear-view mirror 340 of the third embodiment in that, for example, the socket 392 is held at a predetermined position on the mirror body 382 by the urging force drawing the cable 390 inside the mirror body 382. However, since the cable 390 has essentially the same structure as the cord 354 in the third embodiment, the rear-view mirror 380 can provide essentially the same operation and effect as the rear-view mirror 340.

Further, as described above, since the socket 392 is held at the predetermined position on the mirror body 382 by the urging force drawing the cable 390 inside the mirror body 382, if the socket 392 is pulled away from the mirror body 382 in order to illuminate a desired position and thereafter released, the socket 392 can be automatically returned to the original position on the mirror body 382 by the urging force drawing the cable 390 inside the mirror body 382.

Fifth Embodiment

Next, a fifth embodiment of the present invention will be described.

Figure 6:
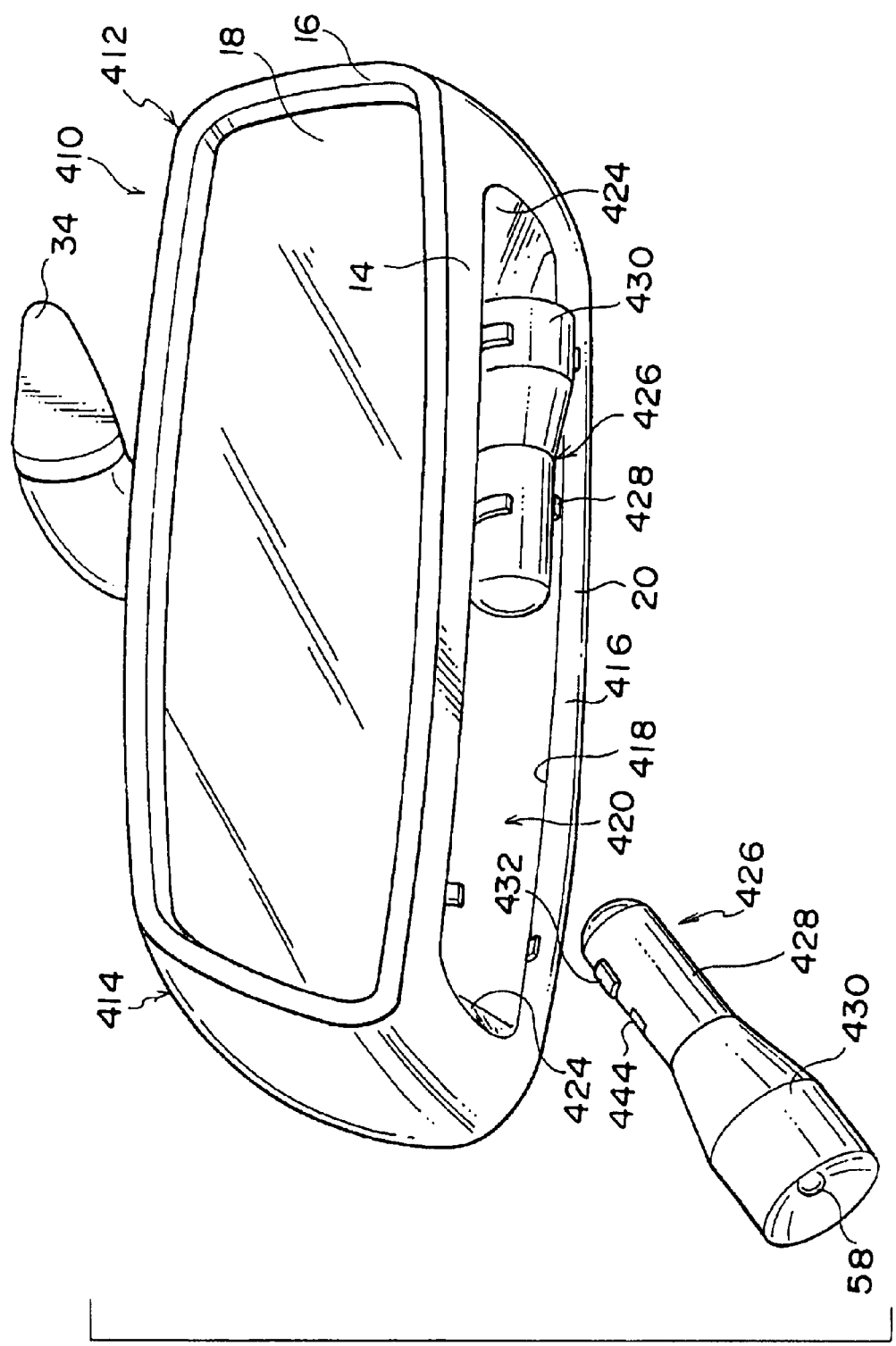
FIG. 6 is a perspective view of an exterior of the rear-view mirror according to a fifth embodiment of the present invention.

FIG. 6 is a perspective view of an exterior of a rear-view mirror 410 (an interior light) according to the fifth embodiment. As shown in FIG. 6, the rear-view mirror 410 includes a mirror body 412. The mirror body 412 has the front wall 14 and the back wall 20. A tubular peripheral wall 414, whose external peripheral shape corresponds to external peripheral shapes of the front wall 14 and the back wall 20, is provided between the front wall 14 and the back wall 20, and both opening ends of the peripheral wall 414 are closed by the front wall 14 and the back wall 20.

A substantially rectangular opening 418 is formed in the longitudinal direction of a lower wall 416 of the peripheral wall 414. The lower wall 416 corresponds to lower ends of the external peripheries of the front wall 14 and the back wall 20. Further, an accommodating member 420 is provided inside the mirror body 412. The accommodating member 420 has a substantially box shape opening toward a lower direction. The shape of the opening end of the accommodating member 420 corresponds to the opening 418, and the accommodating member 420 is connected to the peripheral wall 414 so that an internal periphery of the opening end thereof is substantially coincident with that of the opening 418.

Figure 8:
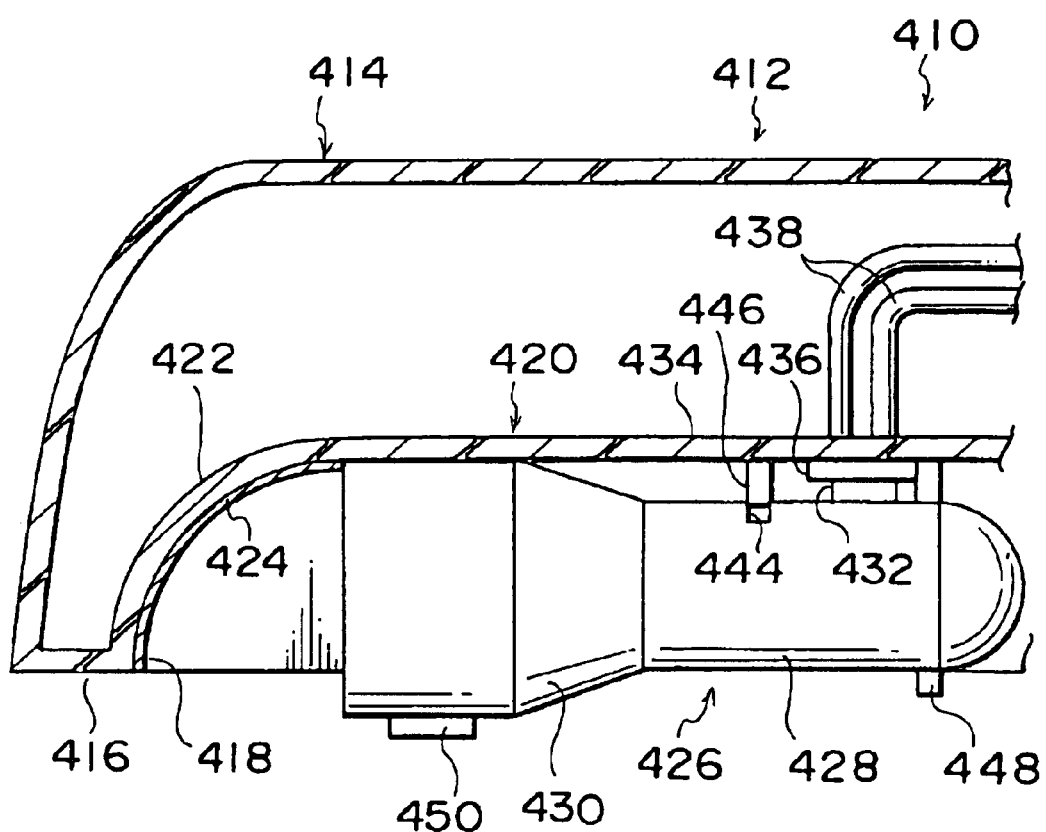
FIG. 8 is a front sectional view of the rear-view mirror according to the fifth embodiment of the present invention.

Inner surfaces of side walls 422 at both longitudinal direction ends of the accommodating member 420 are formed as curved surfaces which are curved with a predetermined position inside the accommodating member 420 as the axis center, and a glossy reflection film 424 is adhered onto each inner surface (FIG. 8). A pair of lamp houses 426 comprising the lighting devices are accommodated inside the accommodating member 420. The lamp house 426 comprises a hollow cylindrical-shaped battery housing 428 for housing the secondary battery 276 (see FIGS. 9 and 10), and a socket 430 which is connected to the side wall 422 side of the battery housing 428. The lamp bulb 58 is attached to the socket 430. A sliding contact point 432 is integrally provided on an external peripheral surface of the battery housing 428, and the sliding contact point 432 slides on a sliding contact point 436 formed at a bottom wall 434 of the accommodating member 420. The sliding contact point 432 is electrically connected to both terminals of the secondary battery 276 inside the battery housing 428.

The sliding contact point 436 is electrically and mechanically connected to one end of a pair of lead wires 438 which are accommodated inside the mirror body 412. The pair of lead wires 438 are connected to a charging circuit (not shown) provided inside the mirror body 412, and electrically connected to the battery of the vehicle (not shown) via the charging circuit. When the sliding contact point 432 is slid onto the sliding contact point 436, the secondary battery 276 can be electrically charged.

Figure 9:
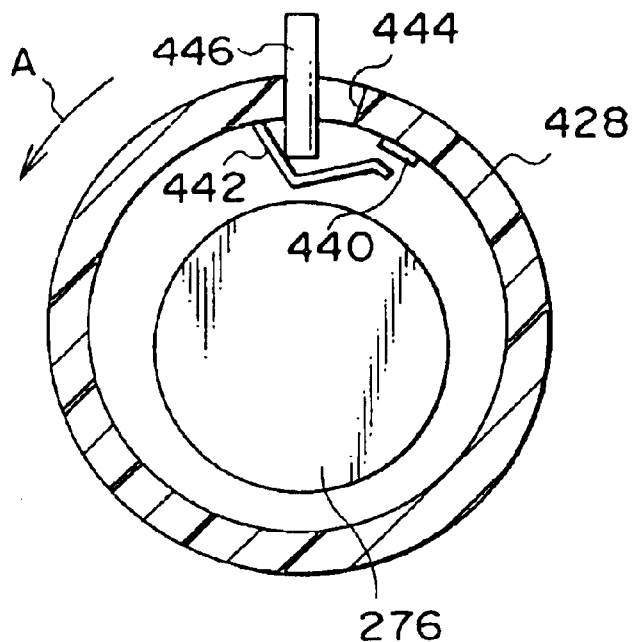
FIG. 9 is a sectional view of essential elements of the lamp house, showing a state in which a movable contact point is separated from a fixed contact point.
Figure 10:
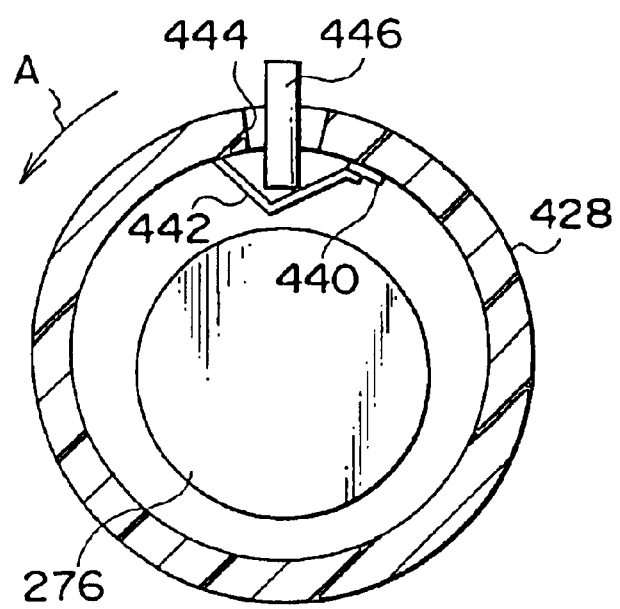
FIG. 10 is a sectional view corresponding to FIG. 9, showing a state in which the movable contact point is in contact with the fixed contact point.

Further, a fixed contact point 440 comprising a switch and a movable contact point 442 bending in a substantially V-shape are provided at an internal periphery of the battery housing 428 (FIGS. 9 and 10). The movable contact point 442 and the fixed contact point 440 form an electric circuit independently of (parallel with) the electric circuit formed by the lead wires 438 and the charging circuit. When the movable contact point 442 contacts the fixed contact point 440, electricity is supplied from the secondary battery 276 to the lamp bulb 58.

Figure 7:
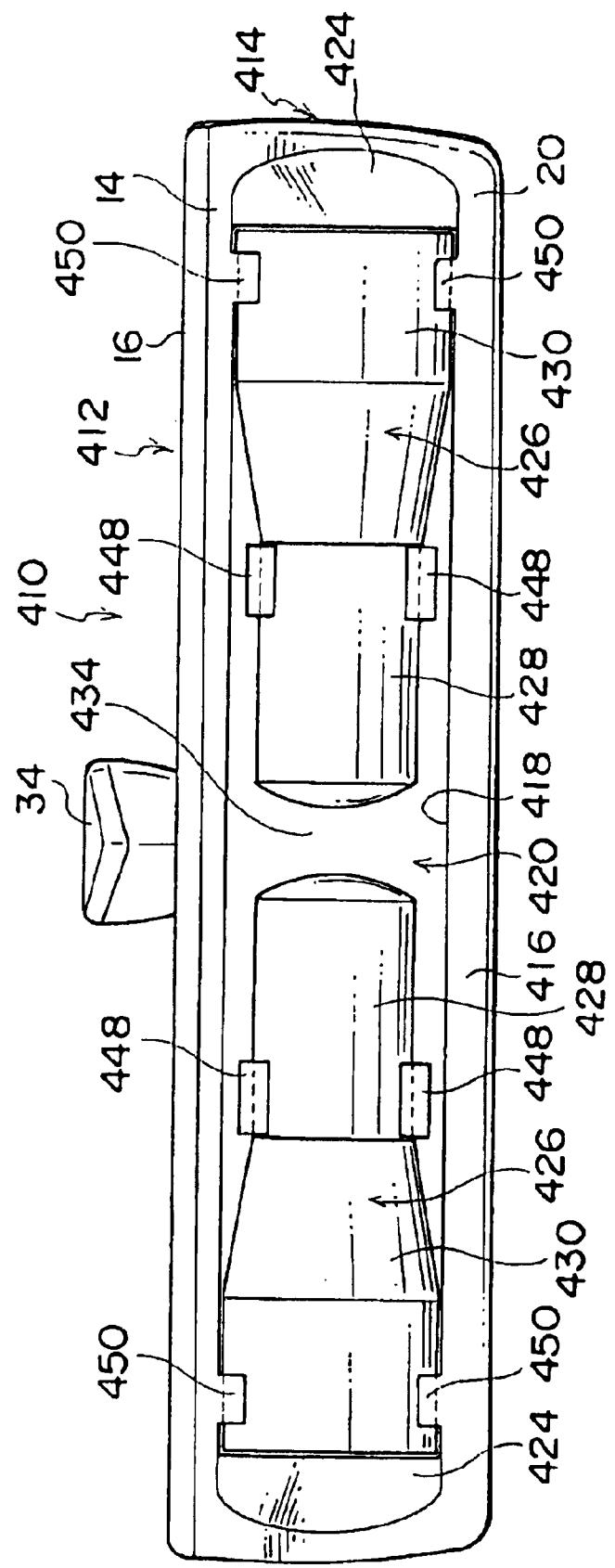
FIG. 7 is a bottom view of the rear-view mirror according to the fifth embodiment of the present invention.

A hole 444 is formed at the battery housing 428 (FIGS. 9 and 10). A pressing piece 446 (see FIG. 8) protruding from the bottom wall 434 of the accommodating member 420 is introduced through the hole 444 into the battery housing 428. A leading end of the pressing piece 446 normally presses against an intermediate portion of the movable contact point 442 so that a leading end of the movable contact point 442 is separated from the fixed contact point 440 (FIG. 7). However, as shown in FIG. 10, when the battery housing 428 is rotated around its own axis in a direction of arrow A, the movable contact point 442 is no longer pressed. Accordingly, the movable contact point 442 rotates with its own elastic force so that the leading end thereof is pressed onto the fixed contact point 440.

A pair of holding pieces 448 serving as holders extend from the accommodating member 420, and nip the battery housing 428 therebetween with their own elastic force. Further, a pair of holding pieces 450 serving as holders extend from portions of the accommodating member 420, which portions are closer to the side wall 422 side than the holding pieces 448, and nip the socket 430 therebetween with their own elastic force (FIGS. 7 and 8).

Operation and Effect of Fifth Embodiment

Next, operation and effect of the fifth embodiment will be described.

When the lamp house 426 is rotated around its own axis in the direction of the arrow A shown in FIG. 10 in a state in which the lamp house 426 is accommodated in the accommodating member 420, the movable contact point 442 rotates with its own elasticity to contact the fixed contact point 440. Accordingly, electricity is supplied from the secondary battery 276 to the lamp bulb 58 and the lamp bulb 58 lights. Since the socket 430 is provided at the side wall 422 side of the battery housing 428, the light from the lamp bulb 58 illuminates outer sides of the front wall 14 and the back wall 20 in the longitudinal directions. However, since the side wall 422 of the accommodating member 420 opposite the lamp bulb 58 is curved and the reflection film 424 is adhered onto the inner surface thereof, the light emitted from the lamp bulb 58 is reflected by the reflection film 424 to illuminate a lower direction (the first illumination direction).

When the lamp house 426 is pulled in the lower direction so that the holding pieces 448 and 450 cease to nip the lamp house 426, the lamp house 426 can be pulled out of the accommodating member 420, i.e., detached from the mirror body 412.

Further, when the lamp house 426 is pulled out from the accommodating member 420, the pressing piece 446 comes out of the hole 444, whereby the movable contact point 442 contacts the fixed contact point 440. Since the secondary battery 276 is contained inside the battery housing 428, and electricity is supplied from the secondary battery 276 to the lamp bulb 58 when the movable contact point 442 contacts the fixed contact point 440, the lamp bulb 58 can emit light even when the lamp house 426 has been detached. When the lamp house 426 has been pulled out from the mirror body 412, the lamp bulb 58 can be oriented in a desired direction to illuminate a desired position. In this manner, the position illuminated by the lamp house 426 is not limited to only the first (initial) illumination direction, but any position may be illuminated in accordance with the position desired to be illuminated.

Sixth Embodiment

Next, a sixth embodiment of the present invention will be described.

Figure 11:
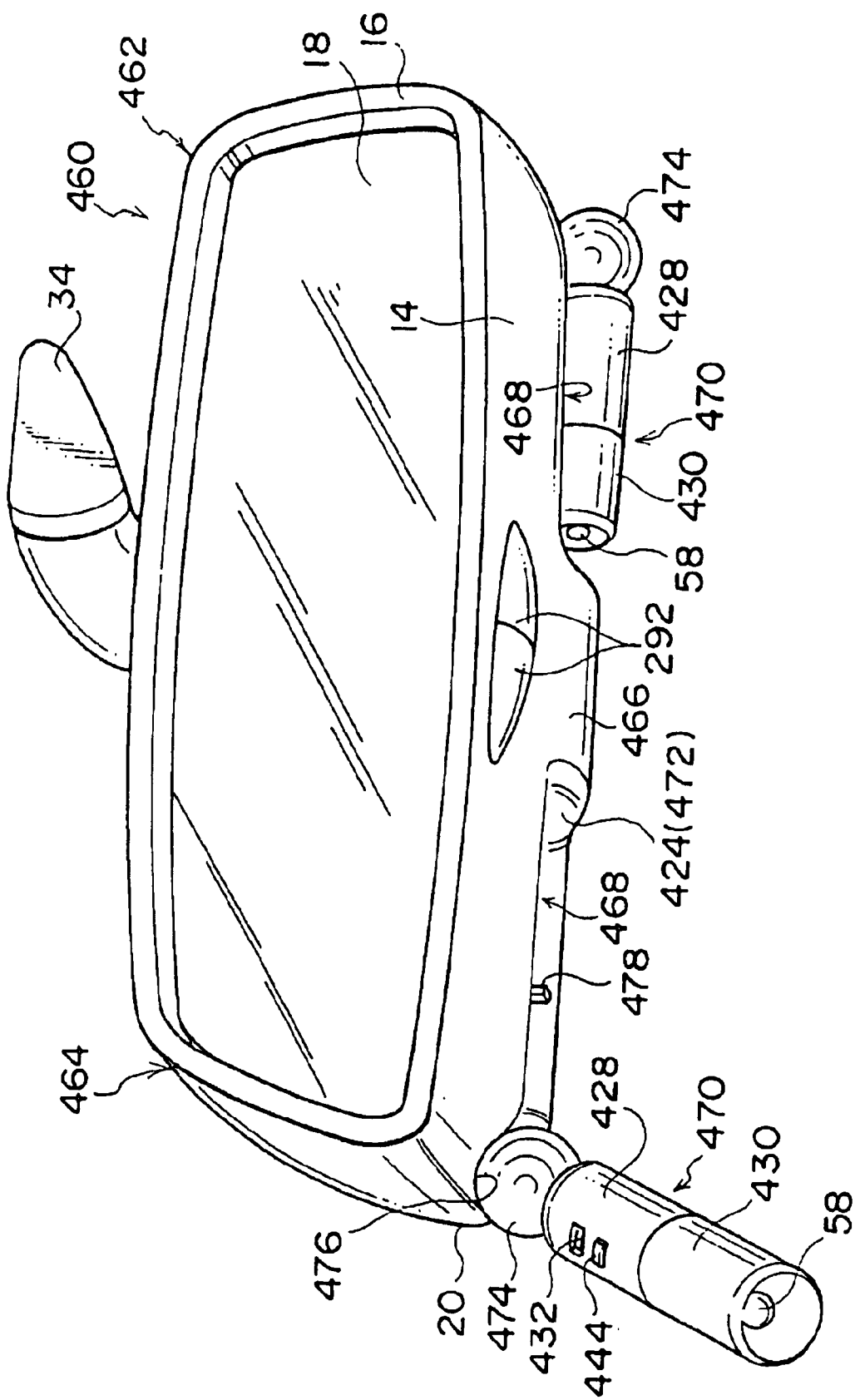
FIG. 11 is a perspective view of an exterior of the rear-view mirror according to a sixth embodiment of the present invention.

FIG. 11 is a perspective view of an exterior of a rear-view mirror 460 (an interior light) according to the sixth embodiment. As shown in FIG. 11, the rear-view mirror 460 includes a mirror body 462. The mirror body 462 has the front wall 14 and the back wall 20. A tubular peripheral wall 464, whose external peripheral shape corresponds to external peripheral shapes of the front wall 14 and the back wall 20, is provided between the front wall 14 and the back wall 20, and both opening ends of the peripheral wall 464 are closed by the front wall 14 and the back wall 20.

Two accommodating members 468, which open toward the lower direction and which are formed in substantially concave shapes, are formed side by side at a lower wall 466 of the peripheral wall 464, which lower wall 466 corresponds to lower ends of the external peripheries of the front wall 14 and the back wall 20, along the longitudinal directions of the front wall 14 and the back wall 20.

A lamp house 470 comprising the lighting device is disposed in the accommodating member 468 (FIG. 11). The lamp house 470 essentially comprises the battery housing 428 and the socket 430 as in the lamp house 426 of the fifth embodiment. However, when the lamp house 470 is accommodated in the accommodating member 468, the socket 430 is oriented toward a longitudinal direction center between the front wall 14 and the back wall 20. A side wall 472 of the accommodating member 468 opposite the socket 430 has a surface which curves in a width direction of the accommodating member 468 with a predetermined position inside the accommodating member 468 as the center. The reflection film 424 is adhered onto the inner surface of the side wall 472.

A permanent magnet 474 serving as a holding member, which is formed in a sphere and made of a ferromagnetic material, is integrally formed at a side of the battery housing 428 opposite to the socket 430. A pivot receiver 476 comprising ferromagnetic material is disposed at a distal end of the accommodating member 468. The shape of the pivot receiver 476 conforms to that of the permanent magnet 474. A radius of curvature for the pivot receiver 476 is substantially the same as that of the permanent magnet 474. The permanent magnet 474 can rotate in a desired direction in a state in which the permanent magnet 474 is in contact with an internal peripheral surface of the pivot receiver 476. Moreover, since the pivot receiver 476 is made of ferromagnetic material, the permanent magnet 474 adheres to the pivot receiver 476 with its own magnetic force when the permanent magnet 474 contacts the pivot receiver 476.

A hole (not shown) is formed in the accommodating member 468 at a predetermined position opposite to the hole 444 formed at the battery housing 428. A pressing piece 478 protrudes from the inside of the mirror body 462 through the hole at the accommodating member 468. The pressing piece 478 is different from the pressing piece 446 in the fifth embodiment. When the switch 292 provided at the peripheral wall 464 is pressed, the pressing piece 478 is moved toward the inside of the mirror body 462.

Operation and Effect of Sixth Embodiment

Next, operation and effect of the sixth embodiment will be described.

When the permanent magnet 474 adheres to the pivot receiver 476, the lamp house 470 is held at the mirror body 462. In this state, when the switch 292 is pressed so that the pressing piece 478 is drawn inside the mirror body 462, the movable contact point 442 rotates toward the fixed contact point 440 in the same manner as in the fifth embodiment, and the movable contact point 442 and the fixed contact point 440 are made conductive (see FIGS. 9 and 10). Accordingly, electricity is supplied from the secondary battery 276 to the lamp bulb 58 and the lamp bulb 58 emits light.

Further, when the permanent magnet 474 is rotated in the state in which the permanent magnet 474 is in contact with the pivot receiver 476, the socket 430 can be oriented toward a desired direction. Therefore, even if the switch 292 is not pressed, the pressing piece 478 is separated from the hole 444, because the battery housing 428 is separated from the accommodating member 468 (FIG. 11). As a result, if the orientation of the socket 430 is changed, the lamp bulb 58 emits light automatically.

Figure 12:
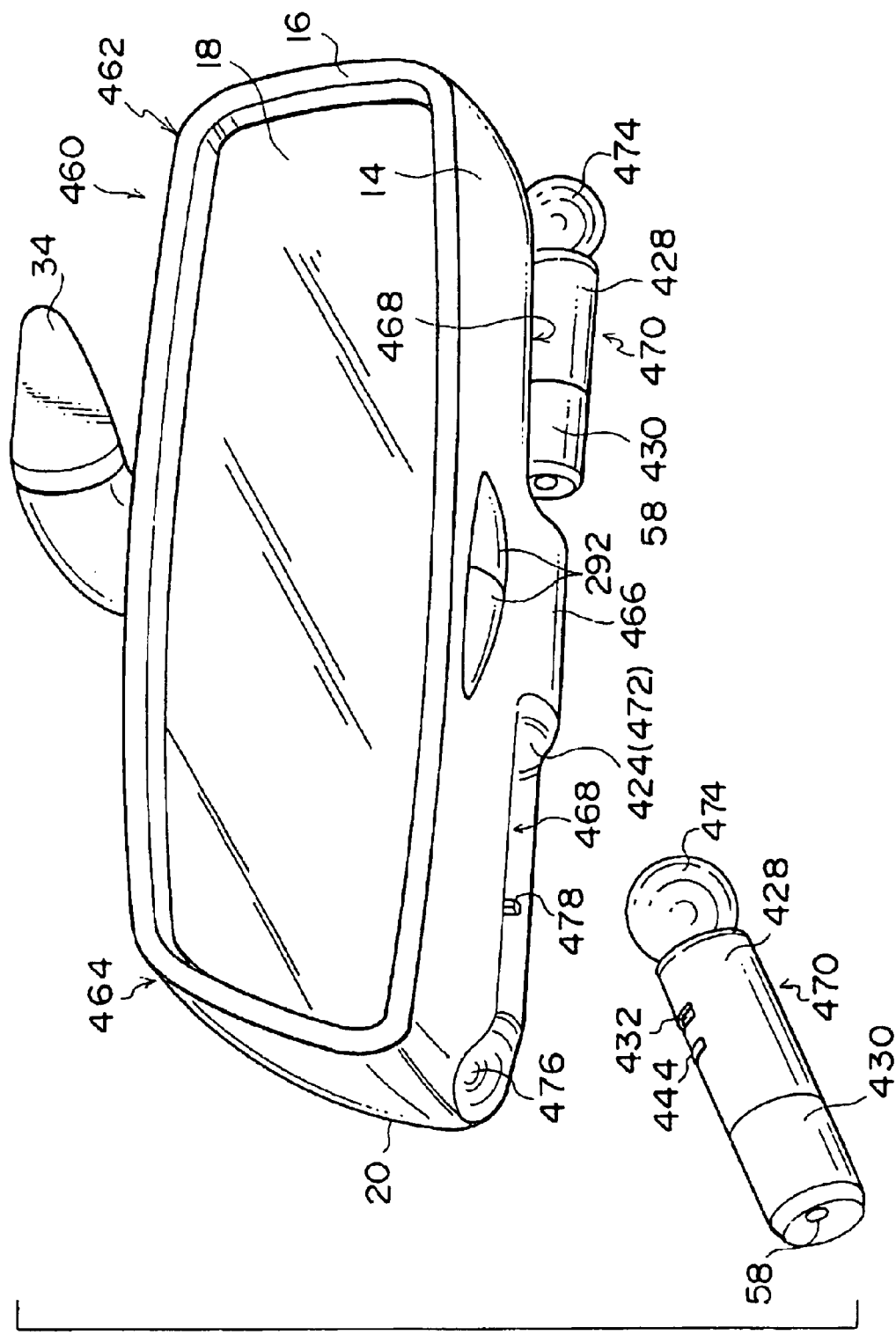
FIG. 12 is a perspective view corresponding to FIG. 11, showing a state in which the lamp house is detached.

Furthermore, if the permanent magnet 474 is separated from the pivot receiver 476 (FIG. 12), the lamp house 470 can be detached from the mirror body 462 in the same manner as in the fifth embodiment. In this state, the rear-view mirror 460 can provide the same operation and effect as the rear-view mirror 410 in the fifth embodiment.

As described above, the position illuminated by the rear-view mirror of the present invention is not limited to only an initial illumination direction (e.g., the lower direction of the vehicle), but any position may be illuminated in accordance with the position desired to be illuminated.

What is claimed is:

1. A rear-view mirror for a vehicle, comprising:
    a mirror body, mounted inside the vehicle, for holding a mirror having a reflecting surface, and
    a lighting device including a light source on one end, and a mounting mechanism on another end that movably mounts said light source directly onto said mirror body such that said light source may be pointed in any direction downwardly and to the side, wherein said mounting mechanism includes a semi-rigid cable connected to said body that supports said light source and is bendable to point and maintain said light source in any direction.

2. A rear-view mirror according to claim 1, wherein said cable is extendible out of and retractable into said mirror body.

3. A rear-view mirror according to claim 1, further comprising a reflector behind said light source for directing light radiated from said source into a beam.

4. A rear-view mirror according to claim 1, wherein said flexible cable includes an electrical wire for conducting power to said light source from said vehicle.

5. A rear-view mirror for a vehicle, comprising:
    a mirror body, mounted inside the vehicle, for holding a mirror having a reflecting surface, and
    a lighting device including a light source on one end, and a mounting mechanism on another end that movably mounts said light source directly onto said mirror body such that said light source may be pointed in any direction downwardly and to the side, wherein said mounting mechanism includes a ball joint swivably mounted into a socket located on said mirror body, said ball joint being able to direct said light source straight down.

6. A rear-view mirror according to claim 5, wherein said lighting device includes a battery for powering said light source, and said ball joint includes a means for detachably connecting said joint to said socket so as to be removable.

7. A rear-view mirror according to claim 5, further comprising a reflector behind said light source for directing light radiated from said source into a beam.

8. A rear-view mirror according to claim 6, wherein said battery is rechargeable, and said ball joint and socket conduct electrical power from a vehicle power source to recharge said battery.

9. A rear-view mirror according to claim 5, wherein said mirror body includes a reflector that reflects light from said lighting device below said mirror body when said lighting device is positioned into a retracted position and said light source of said device is actuated.

10. A rear-view mirror for a vehicle, comprising:
    a mirror body, mounted inside the vehicle, for holding a mirror having a reflecting surface, said body including a bottom wall having a recess;
    a lighting device including a lamp housing having a lamp, and a clip that detachably and frictionally connects said lamp housing within said recess when said housing is slid into said recess;
    an electrical cable that electrically and mechanically connects said lighting device to said mirror body, and
    an urging device for urging the cable into the mirror body.

11. A rear-view mirror for a vehicle, comprising:
    a mirror body, mounted inside the vehicle, for holding a mirror having a reflecting surface, said body including a recess;
    a lighting device including a housing having a means for detachably mounting the lighting device within said recess of said mirror body and having a light source at one end, and a battery for powering said light source, and
    a light reflector at one end of said recess that is detached from said lighting device housing for directing light radiated by said lighting device downwardly from said mirror body when said lighting device is positioned within said recess and actuated.

12. A rear-view mirror according to claim 11, wherein said lighting device includes a switch means for actuating said light source operable by rotating one end of said device relative to another end.

13. A rear-view mirror for a vehicle, comprising:
    a mirror body, mounted inside the vehicle, for holding a mirror having a reflecting surface, said body including a recess;
    a lighting device detachably mountable within said recess of said mirror body and having a light source at one end, and
    a light reflector at one end of said recess for directing light radiated by said lighting device downwardly from said mirror body when said lighting device is positioned within said recess and actuated;

wherein said lighting device includes a switch means for actuating said light source when said lighting device is removed from said recess in said mirror body.

14. A rear-view mirror for a vehicle, comprising:

a mirror body, mounted inside the vehicle, for holding a mirror having a reflecting surface, said body including a recess defined by bottom and side openings in said mirror body;

a lighting device having a housing substantially complementary in shape to said recess and slidable into and out of retaining engagement with the side opening of the recess, wherein said housing of said lighting device includes a wall registrable with said bottom opening of said recess, said wall including a light source and a switch accessible through said bottom opening.

15. A rear-view mirror according to claim 14, wherein said recess includes retaining rails on opposing sides of said bottom opening for retaining said lighting device.

16. A rear-view mirror according to claim 14, wherein opposing side walls of said recess are tapered toward bottom edges of one another to retain said lighting device.

* * * * *